US011074001B2

(12) United States Patent
Chen et al.

(10) Patent No.: US 11,074,001 B2
(45) Date of Patent: Jul. 27, 2021

(54) MANAGING VIRTUAL-MACHINE IMAGE CLONING

(71) Applicant: Red Hat, Inc., Raleigh, NC (US)

(72) Inventors: Huamin Chen, Westboro, MA (US); Adam Gerard Litke, Bethel Park, PA (US); Fabian Deutsch, Thedinghausen (DE)

(73) Assignee: Red Hat, Inc., Raleigh, NC (US)

( * ) Notice: Subject to any disclaimer, the term of this patent is extended or adjusted under 35 U.S.C. 154(b) by 266 days.

(21) Appl. No.: 15/948,614

(22) Filed: Apr. 9, 2018

(65) Prior Publication Data

US 2019/0310775 A1   Oct. 10, 2019

(51) Int. Cl.
| | | |
|---|---|---|
| *G06F 12/00* | (2006.01) | |
| *G06F 3/06* | (2006.01) | |
| *G06F 9/455* | (2018.01) | |

(52) U.S. Cl.
CPC ............ *G06F 3/065* (2013.01); *G06F 3/0619* (2013.01); *G06F 3/0665* (2013.01); *G06F 3/0683* (2013.01); *G06F 9/45558* (2013.01); *G06F 2009/45583* (2013.01)

(58) Field of Classification Search
CPC ...... G06F 3/065; G06F 3/0619; G06F 3/0665; G06F 3/0683
See application file for complete search history.

(56) References Cited

U.S. PATENT DOCUMENTS

| 8,151,263 | B1 | 4/2012 | Venkitachalam et al. | |
| 8,615,588 | B2 | 12/2013 | Dorai et al. | |
| 8,775,773 | B2 | 7/2014 | Acharya et al. | |
| 9,116,803 | B1 * | 8/2015 | Agrawal | G06F 11/0751 |
| 9,250,946 | B2 | 2/2016 | Gaonkar et al. | |
| 9,733,964 | B2 | 8/2017 | Blake | |
| 2013/0007436 | A1 * | 1/2013 | Bookman | G06F 3/0638 |
| | | | | 713/2 |
| 2013/0031310 | A1 * | 1/2013 | Morita | G06F 9/45533 |
| | | | | 711/129 |
| 2014/0258595 | A1 * | 9/2014 | Venkatesha | G06F 9/5016 |
| | | | | 711/103 |

(Continued)

OTHER PUBLICATIONS

Cache Write Policies and Performance, Norman P. Jouppi, IEEE (Year: 1993).*

(Continued)

*Primary Examiner* — Gurtej Bansal
(74) *Attorney, Agent, or Firm* — Kilpatrick Townsend & Stockton LLP

(57) ABSTRACT

Cloning of virtual-machine images can be managed. For example, a computing device can copy a segment of a virtual-machine image stored in a second storage device to a first storage device in response to receiving a first read request for the segment from a virtual machine. The first storage device may be capable of responding to read requests from the virtual machine with less latency than the second storage device. The computing device can also update a log to indicate that the segment is stored on the first storage device. Thereafter, the computing device can receive a second read request for the segment. In response, the computing device can determine that the segment is stored in the first storage device using the log, and provide the segment by obtaining the segment from the first storage device.

20 Claims, 4 Drawing Sheets

(56) References Cited

U.S. PATENT DOCUMENTS

| | | | | |
|---|---|---|---|---|
| 2016/0162409 A1* | 6/2016 | Kim | .................... | G06F 9/4401 |
| | | | | 711/137 |
| 2016/0357683 A1* | 12/2016 | Takeda | ............... | G06F 12/1027 |
| 2017/0024327 A1* | 1/2017 | Saidi | .................... | G06F 12/126 |

OTHER PUBLICATIONS

Corrice, C., "Conatiner-native storage for the OpenShift masses," Oct. 5, 2017, https://redhatstorage.redhat.com/2017/10/05/container-native-storage-for-the-openshift-masses/.

Peltola, M. "Storage Solutions for Distributed Dockeized Cloud," School of Electrical Engineering, 2016, https://aaltodoc.aalto.fi/bitstream/handle/123456789/20336/master_Peltola_Markus_2016.pdf?sequence=1&isAllowed=y.

"QEMU and Block Devices " http://docs.ceph.com/docs/jewel/rbd/qemu-rbd/.

* cited by examiner

MANAGING VIRTUAL-MACHINE IMAGE CLONING

TECHNICAL FIELD

The present disclosure relates generally to file management. More specifically, but not by way of limitation, this disclosure relates to managing virtual-machine image cloning.

BACKGROUND

A virtual machine can be a substantially isolated environment that has its own operating system, software applications, and virtualized hardware. For example, a virtual machine can have a virtual Central Processing Unit (vCPU), a virtual Random Access Memory (vRAM), and other components. Virtual machines are launched from image files, which can be referred to as images. Typically, images include the underlying operating-system files, data files, and applications for provisioning a virtual machine. As a result, images are often relatively large in size, exceeding 1 gigabyte (GB) or more.

DETAILED DESCRIPTION

Figure 1:
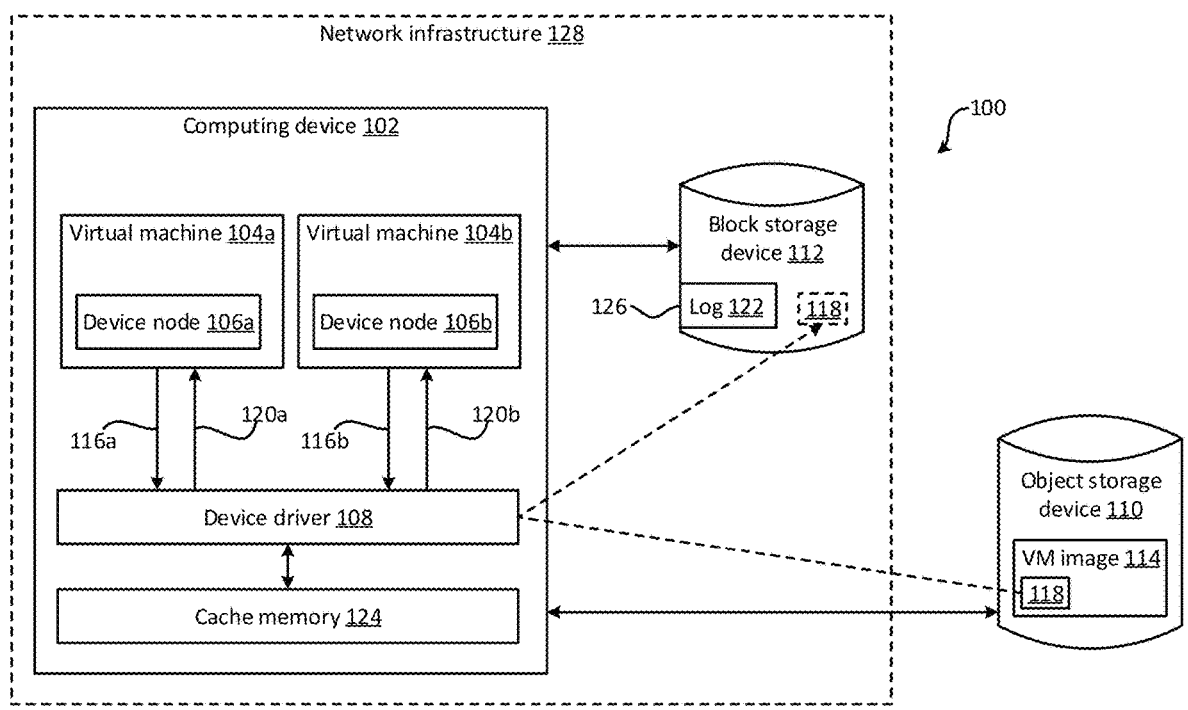
FIG. 1 is a block diagram of an example of a system for managing virtual-machine image cloning according to some aspects.

The relatively large sizes of virtual-machine images can result in a variety of problems. For example, these images are often stored in a central repository from which copies of the images are downloaded as needed (or "cloned") by client devices. But it can take a long time for the client devices to download the images from the central repository, given the large sizes of the images. For example, it can take several minutes or hours to download a single image. And the client devices typically do not preemptively download images before they are needed. As a result, it can take a significant amount of time for a client device to deploy a virtual machine (e.g., for the first time). For example, a client device can receive a command to deploy a virtual machine. The client device may then have to download an image associated with the virtual machine from the central repository, which can take a significant amount of time, before ultimately deploying the virtual machine. This process can introduce a large amount of latency in deploying the virtual machine.

Some examples of the present disclosure can overcome one or more of the abovementioned issues by selectively copying segments of a virtual-machine image (e.g., stored in a central repository) in response to requests for those segments, rather than attempting to download the entire image all at once. For example, a client device can download the minimal amount of an image required to initiate a boot-up process through which a virtual machine is deployed. The client device can then attempt to boot up the virtual machine. As the virtual machine boots up, the virtual machine can issue read requests for certain segments of the virtual-machine image. In some examples, the client device can detect these read requests, obtain the requested segments from the central repository, and provide the segments back to the virtual machine. By selectively downloading the segments "on demand," the startup latency, data traffic, and computational overhead required to launch a virtual machine can be significantly reduced.

After downloading an image segment requested by the virtual machine, in some examples, the client device can store the segment in a local storage device. A local storage device can be a storage device that is internal to the client device, accessible to the client device via a local area network (LAN), or part of the physical infrastructure that includes the client device. Storing the segment in a local storage device can enable the client device to more quickly obtain the segment again in the future, as opposed to having to download the segment again from the central repository. For example, if the same virtual machine or another virtual machine issues a subsequent read request for the segment, the client device can quickly obtain the segment from the local storage device and provide it back to the virtual machine. This can reduce the latency in responding to these subsequent read requests, prevent duplicate copies of the same image-segments from being downloaded and stored (thereby reducing bandwidth and memory consumption), and improve scalability.

In some examples, the client device can determine whether to obtain an image segment from the local storage device or the central repository by maintaining a log. The log can indicate which segments of a virtual-machine image are stored in the local storage device. As a particular example, the client device can receive a read request for a certain image segment from a virtual machine. In response, the client device can analyze the log to determine if the segment is already stored in the local storage device. If so, the client device can retrieve the segment from the local storage device and provide the segment to the virtual machine. Otherwise, the client device can download the segment from the central repository (e.g., as discussed above) and provide the segment to the virtual machine. The client device may also store a copy of the segment in the local storage device and update the log to reflect that the segment is now available in the local storage device. This can enable the client device to respond to subsequent read requests for the segment using the copy of the segment stored in the local storage device.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for managing virtual-machine image cloning according to some aspects. The system 100 includes a computing device 102, such as a client device, server, or desktop computer. The computing device 102 may be running one or more virtual machines 104*a-b*.

The virtual machines 104*a-b* can have device nodes 106*a-b*. A device node can provide a software link to a device driver, which can interface with a hardware device. For example, a device node can provide a software link to a storage driver for communicating with a storage device, such as a hard disk. In some examples, the device nodes 106a-b can be located in /dev directories of a Unix-based environment. For example, device node 106a can be located at /dev/sdx in the operating system of virtual machine 104a, and device node 106b can be located at /dev/sdy in the operating system of virtual machine 104b. In this example, the virtual machines 104a-b can use the device nodes 106a-b to communicate with device driver 108.

The device driver 108 can be a storage driver for interfacing with one or more storage devices. One example of a storage device is a block storage device 112, such as Internet Small Computer System Interface (iSCSI) storage or RADOS Block Device (RBD) storage. A block storage device 112 can store data in fixed sized volumes, which can be referred to as data blocks. Each data block can be assigned an arbitrary identifier by which it can be located and retrieved, but generally no additional metadata is stored with the data block to provide additional context about the data block. The block storage device 112 may be accessed by the device driver 108 through a read/write protocol (e.g., an iSCSI protocol) that provides for both reading and writing of data. In some examples, the block storage device 112 is a local storage device and within the same network infrastructure 128 as the computing device 102. Another example of a storage device is an object storage device 110, such as Amazon Web Services™ S3 storage or Azure™ blob storage. An object storage device 110 can group data and metadata together in one object, where the metadata can provide additional context about the data. Each object can have a unique identifier by which it can be located and retrieved from the object storage device 110. The object storage device 110 may be accessed by the device driver 108 through a read-only protocol that only allows for reading, but not writing, of data. In some examples, the object storage device 110 is a remote storage device that is geographically remote from the computing device 102, accessible to the computing device 102 via the Internet, or both. This can result in the block storage device 112 being capable of responding to read requests with less latency than the object storage device 110. Additionally or alternatively, the block storage device 112 can respond to read requests with less latency than the object storage device 110 due to the operational differences in the physical architectures of the storage devices (e.g., block storage devices can have better performance characteristics than object storage devices).

The virtual machines 104a-b can transmit read requests 116a-b to the device driver 108 to obtain segments of a virtual-machine image 114 stored in the object storage device 110. The virtual machine 104a can transmit the read requests 116a-b during one or more operational states, such as during a boot-up process, runtime, or both. The device driver 108 can receive the read requests 116a-b and responsively determine if the segments of data already exist in the block storage device 112. For example, the device driver 108 can generate a log 122 in the block storage device 112. The device driver 108 may generate the log 122 by creating a partition 126 in the block storage device 112 and generating the log 122 within the partition 126 (e.g., prior to or subsequent to the computing device 102 deploying a virtual machine). The log 122 can indicate which image segments are stored in the block storage device 112. The device driver 108 can analyze the log 122 to determine whether the segments exist in the block storage device 112. If so, the device driver 108 can obtain the segments from the block storage device 112 and provide them to the virtual machines 104a-b as read responses 120a-b. If not, the device driver 108 can obtain the segments from the object storage device 110 and provide them to the virtual machines 104a-b as read responses 120a-b. The device driver 108 may then store the segments in the block storage device 112, and update the log 122 to reflect that the segments are stored in the block storage device 112.

As a particular example, the virtual machine 104a can transmit a read request 116a for a segment 118 of the virtual-machine image 114. The device driver 108 can receive the read request 116a, determine that the segment 118 does not exist in the block storage device 112 using the log 122, and responsively obtain the segment 118 from the object storage device 110. The device driver 108 can then provide the segment 118 in a read response 120a to the virtual machine 104a. The device driver 108 can also store a copy of the segment 118 in the block storage device 112 (e.g., as indicated by a dashed arrow in FIG. 1) and update the log 122. Thereafter, if either of the virtual machines 104a-b transmits a read request for the segment 118, the device driver 108 can determine that the segment 118 exists in the block storage device 112, obtain the segment 118 from the block storage device 112, and provide the segment 118 to the virtual machine. This can be substantially faster than re-acquiring the segment 118 from the object storage device 110, given the lower amount of latency associated with the block storage device 112.

In some examples, the device driver 108 can store one or more segments of the virtual-machine image 114 in a cache memory 124. For example, the device driver 108 can perform some or all of the above steps, but rather than storing the segment 118 in the block storage device 112, the device driver 108 can store the segment 118 in the cache memory 124. This can make the segment 118 more quickly accessible than storing the segment 118 in the block storage device 112. In other examples, the device driver 108 can store copies of the segment 118 in both the cache memory 124 and the block storage device 112. In some such examples, the device driver 108 can respond to read requests 116a-b for the segment 118 using the copy stored in the cache memory 124 until the copy is removed from (e.g., overwritten in) the cache memory 124. Thereafter, the device driver 108 can respond to read requests 116a-b for the segment 118 using the copy stored in the block storage device 112.

In some examples, the device driver 108 can identify a segment of the virtual-machine image 114 as being frequently requested, and maintain a copy of the segment in the cache memory 124 for quick retrieval. For example, the device driver 108 can analyze read requests 116a-b from one or more virtual machines 104a-b to determine that a particular segment of the virtual-machine image 114 is frequently requested (e.g., requested more than a predefined number of times within a predefined time period). So, the device driver 108 can store a copy of the particular segment in the cache memory 124. This can enable the particular segment to be more quickly provided in response to read requests.

In some examples, the virtual machines 104a-b can transmit the read requests 116a-b in a certain format that is compatible with one storage device, but not another storage device. So, the device driver 108 can translate at least a portion of the read requests 116a-b between formats. For example, the virtual machine 104a can issue some or all its read requests in a block format for use with the block storage device 112. The virtual machine 104a may issue the read requests in the block format because the device driver 108 may only present the block storage device 112 to the virtual machine 104a for use. In some such examples, the device driver 108 can receive a read request 116a for a data block and determine that the data block is not stored in the block storage device 112. So, the device driver 108 can determine that the data block is to be acquired from the object storage device 110. But the object storage device 110 may not store data in a block format. For example, the object storage device 110 may store the virtual-machine image 114 in a QEMU Copy On Write 2 (QCOW2) format. So, the device driver 108 can translate at least a portion of the read request 116a into an object format for use with the object storage device 110. For example, the device driver 108 can use a lookup table or algorithm to determine that the data block identified in the read request 116a corresponds to a particular offset in the virtual-machine image 114. The device driver 108 can use the particular offset to obtain the appropriate data from the object storage device 110. After obtaining the data from the object storage device 110, the device driver 108 can translate the data back into the block format, for example, to communicate the data back to the virtual machine 104a, store the data in the block storage device 112, or both. The device driver 108 can effectuate any number and combination of format translations to interface between the virtual machine 104a and one or more storage devices.

In some examples, the virtual machines 104a-b can transmit delete commands for removing image segments from the block storage device 112. For example, a virtual machine 104a can transmit a delete command indicating that the segment 118 is to be deleted from the block storage device 112. The device driver 108 can receive the delete command and responsively update the log 122 to indicate that the segment is not stored in the block storage device 112. This may "delete" the segment 118 from the perspective of the virtual machine 104a. Additionally or alternatively, the device driver 108 can receive the delete command and responsively remove the segment 118 from the block storage device 112.

Figure 2:
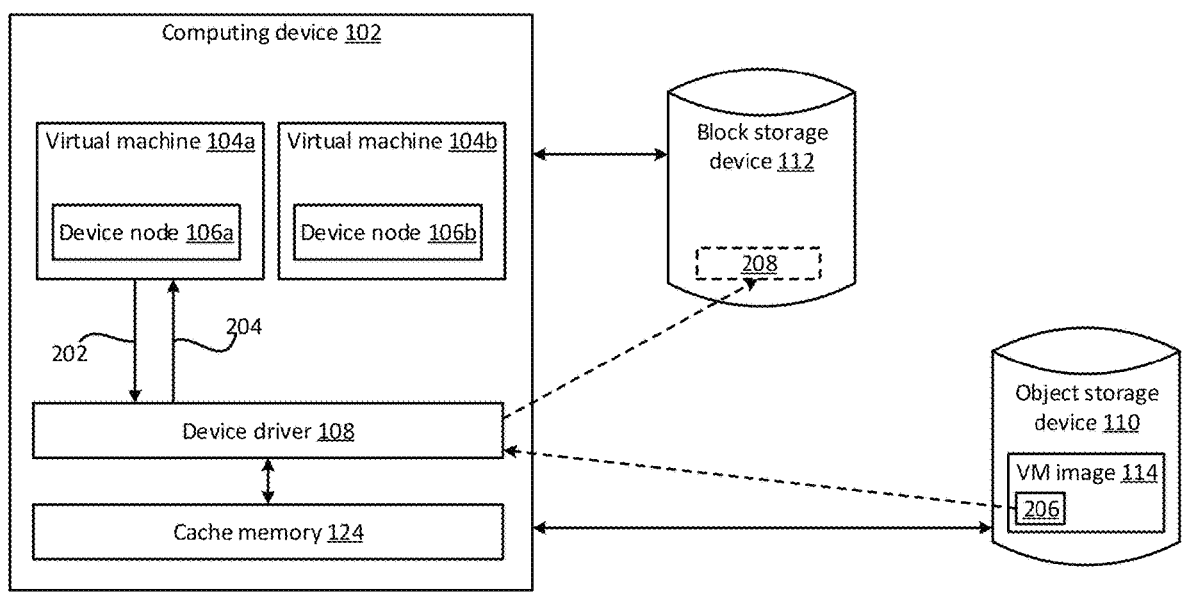
FIG. 2 is a block diagram of another example of a system for managing virtual-machine image cloning according to some aspects.

In some examples, the device driver 108 can enable the virtual machines 104a-b to write data to the block storage device 112, for example as shown in FIG. 2. Turning to FIG. 2, the virtual machine 104a may transmit a write command 202 indicating that only a portion of a data block is to be overwritten with new data. The virtual machine 104a may transmit the write command 202 as a result of performing calculations or other operations. The device driver 108 can receive the write command 202 and determine if the data block already exists in the block storage device 112. If so, the device driver 108 can overwrite the portion of the data block with the new data. If not, the device driver 108 can retrieve data 206 corresponding to the data block (e.g., the entire data block) from the object storage device 110. The device driver 108 can then overwrite a subset of the data 206 with the new data indicated in the write command 202. This can result in an updated version of the data block 208. The device driver 108 can then store the updated version of the data block 208 in the block storage device 112.

As another example, the virtual machine 104a may transmit a write command 202 indicating that an entire data block is to be overwritten with new data. The device driver 108 can receive the write command 202 and responsively store the entire data block in the block storage device 112, without retrieving the corresponding data 206 from the object storage device 110. The device driver 108 may perform this process regardless of whether a prior version of the data block is stored in the block storage device 112, since the entire data block is being overwritten.

While FIGS. 1-2 depict certain numbers, combinations, and arrangements of components, these are merely examples. Other examples can involve different amounts, combinations, and arrangements of components. For example, some systems of the present disclosure can involve more or fewer virtual machines 104a-b or storage devices than are depicted in FIGS. 1-2. And some systems of the present discloser can involve different types or arrangements of storage devices than the storage devices shown in FIGS. 1-2. Further, some or all of the functionality of the device driver 108 can be implemented by another hardware or software component, such as a software application associated with a virtual machine.

Figure 3:
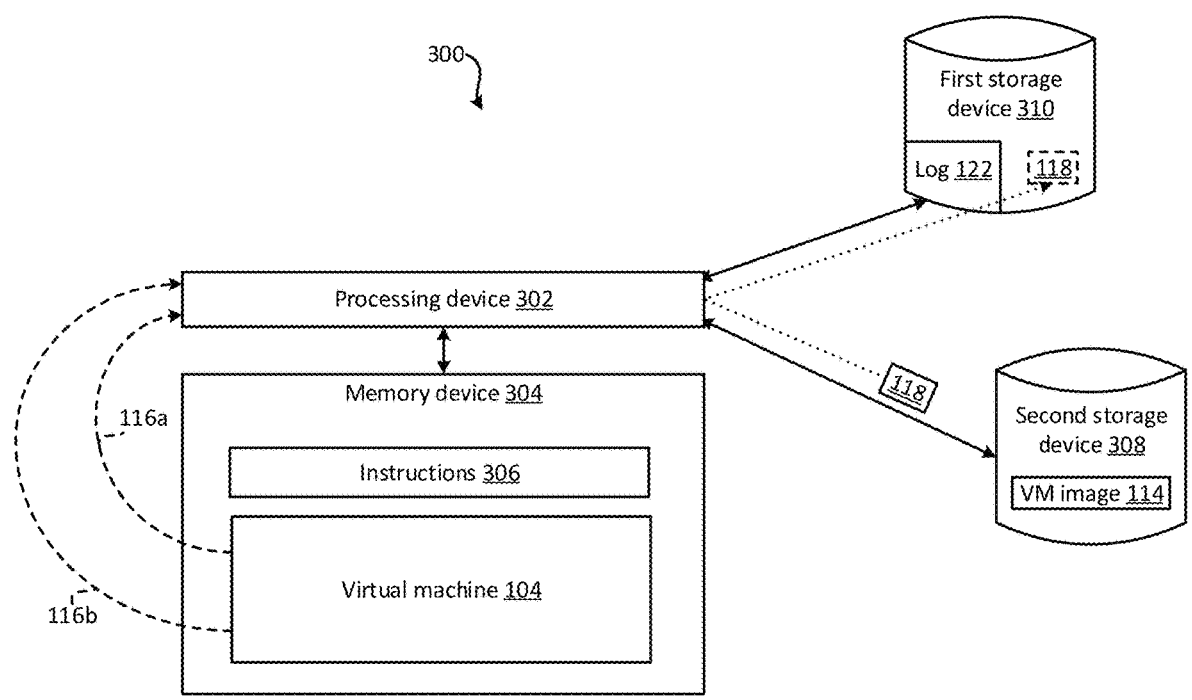
FIG. 3 is a block diagram of still another example of a system for managing container-image layers according to some aspects.

FIG. 3 is a block diagram of still another example of a system 300 for managing container-image layers according to some aspects. The system 300 includes a processing device 302 communicatively coupled to a memory device 304. In some examples, the processing device 302 and the memory device 304 can be housed in a single device, such as computing device 102. In other examples, the processing device 302 and the memory device 304 can be distributed from one another.

The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 302 can execute instructions 306 stored in the memory device 304 to perform operations. In some examples, the instructions 306 can include processor-specific instructions generated by a compiler or an interpreter from code written in any suitable computer-programming language, such as C, C++, C#, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a medium from which the processing device 302 can read instructions 306. A computer-readable medium can include electronic, optical, magnetic, or other storage devices capable of providing the processing device 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processing device 302 can detect a first read request 116a from a virtual machine 104 for a segment 118 of a virtual-machine image 114. The virtual-machine image 114 can be stored in a second storage device 308, such as a block storage device, an object storage device, or another type of storage device. The processing device 302 can obtain only a copy of the segment 118 indicated in the first read request 116a. The processing device 302 can then store the copy of the segment 118 in a first storage device 310. The first storage device 310 may be a block storage device, an object storage device, or another type of storage device. This process is indicated by the dotted arrow in FIG. 3.

The processing device 302 can also update a log 122 to indicate that the segment 118 of the virtual-machine image 114 is stored in the first storage device 310. For example, the processing device 302 can set a flag in the log 122, append data to the log 122, or overwrite a portion of the log 122 to indicate that the segment 118 of the virtual-machine image 114 is stored in the first storage device 310.

In some examples, the processing device 302 can receive a second read request 116b for the segment 118 from the virtual machine 104. The processing device 302 can receive the second read request 116b subsequent to receiving the first read request 116a. The processing device 302 can receive the second read request 116b from the same virtual machine or a different virtual machine. For example, the box labeled "virtual machine 104" in FIG. 3 can represent multiple virtual machines, which can be collectively referred to as a virtual machine. In some such examples, the first read request 116a can be transmitted by one of the virtual machines and the second read request 116b can be transmitted by another one of the virtual machines. After receiving the second read request 116b, the processing device 302 can determine that the segment 118 is stored in the first storage device 310 using the log 122, obtain the segment 118 from the first storage device 310, and provide the segment 118 to the virtual machine.

Figure 4:
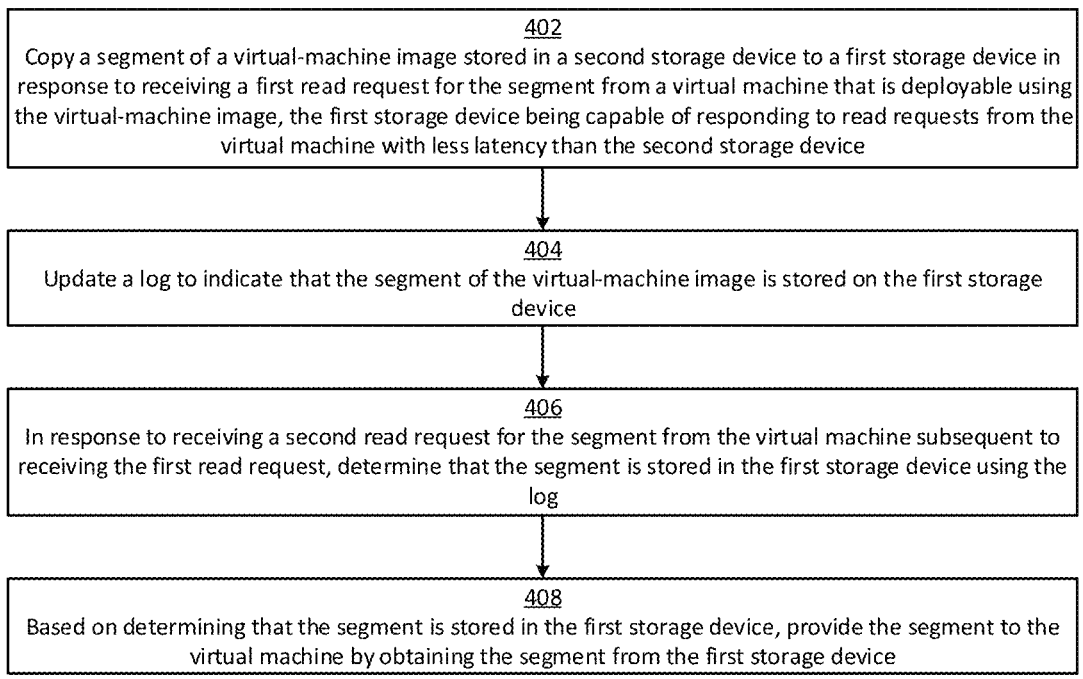
FIG. 4 is a flow chart of an example of a process for managing virtual-machine image cloning according to some aspects.

In some examples, the processing device 302 can perform some or all of the steps shown in FIG. 4. Other examples can include more steps, fewer steps, different steps, or a different order of the steps than are depicted in FIG. 4. The steps of FIG. 4 are described with reference to the components discussed above with regard to FIG. 3.

In block 402, a processing device 302 copies a segment 118 of a virtual-machine image 114 stored in a second storage device 308 to a first storage device 310 in response to receiving a first read request 116a for the segment 118 from a virtual machine 104 that is deployable using the virtual-machine image 114. The first storage device 310 can be capable of responding to read requests (e.g., transmitted from the processing device 302) with less latency than the second storage device 308.

In some examples, copying the segment 118 can involve translating an identifier of the segment 118 that is in the first read request 116a into another format suitable for use with the second storage device 308. The processing device 302 can then transmit a read command that includes the translated identifier to the second storage device 308. The second storage device 308 can receive the read command, identify the segment 118 using the translated identifier, and respond to the read command by communicating a copy of the segment 118 back to the processing device 302. The processing device 302 can then store the copy of the segment 118 in the first storage device 310.

In block 404, the processing device 302 updates a log 122 to indicate that the segment 118 of the virtual-machine image 114 is stored in the first storage device 310. The processing device 302 can update the log 122 before or after acquiring the segment 118 from the second storage device 308. In some examples, updating the log 122 can involve first creating the log 122. This may involve generating a partition in the first storage device 310 and then creating the log 122 within the partition. Alternatively, the processing device 302 can create and store the log 122 in another manner. The log 122 can have any suitable format or structure (e.g., a database structure).

In block 406, the processing device 302 determines that the segment 118 is stored in the first storage device 310 using the log 122 in response to receiving a second read request 116b for the segment 118 from the virtual machine 104. The processing device 302 can receive the second read request 116b subsequent to receiving the first read request 116a. The processing device 302 can determine that the segment 118 is stored in the first storage device 310 by, for example, analyzing the log 122 to determine the contents of an entry or the value of a parameter corresponding to the segment 118.

In block 408, the processing device 302 provides the segment 118 to the virtual machine 104 by obtaining the segment 118 from the first storage device 310. The processing device 302 can provide the segment 118 to the virtual machine 104 based on determining that the segment 118 is stored in the first storage device 310 (e.g., in block 406).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

The invention claimed is:

1. A system comprising:
a processing device; and
a memory device including instructions that are executable by the processing device for causing the processing device to:
  receive a read request from a virtual machine during a process for deploying the virtual machine using an image file, the read request being for obtaining a segment of the image file for use by the virtual machine;
  in response to receiving the read request:
    download the segment of the image file from a remote storage device over a network;
    store the segment of the image file in a local storage device that is a block storage device;
    store the segment of the image file in a cache memory that is separate from the local storage device;
    update a log to indicate that the segment of the image file is stored in the local storage device, the log being configured to be dynamically updated as segments of the image file are stored in the local storage device over time; and
    return the downloaded segment to the virtual machine;
  receive a delete command indicating that the segment of the image file is to be deleted from the local storage device; and
  update the log in response to receiving the delete command.

2. The system of claim 1, wherein the instructions are for a device driver configured to interface between the virtual machine and the local storage device.

3. The system of claim 1, wherein the remote storage device is an object storage device.

4. The system of claim 1, wherein the memory device further comprises instructions that are executable by the processing device for causing the processing device to, prior to downloading the segment of the image file from the remote storage device:
  create a partition in the local storage device for storing the log; and
  generate the log within the partition.

5. The system of claim 1, wherein the memory device further comprises instructions that are executable by the processing device for causing the processing device to:

receive a write command from the virtual machine, the write command being for storing data in the local storage device;
determine that a prior version of the data does not exist in the local storage device using the log; and
in response to determining that the prior version of the data does not exist in the local storage device:
obtain the prior version of the data from the remote storage device;
overwrite a portion of the prior version of the data with new data indicated in the write command, thereby forming an updated version of the data;
store the updated version of the data in the local storage device; and
update the log to indicate that the data is stored in the local storage device.

6. The system of claim 1, wherein the process includes a boot-up process for the virtual machine.

7. The system of claim 1, wherein the virtual machine is a first virtual machine, and wherein the memory device further comprises instructions that are executable by the processing device for causing the processing device to deploy a second virtual machine that is separate from the first virtual machine, wherein deploying the second virtual machine involves:
receiving read requests from the second virtual machine during a boot-up process for deploying the second virtual machine using the image file, the read requests being for obtaining a group of segments of the image file for use by the second virtual machine; and
in response to receiving the read requests:
determining, using the log, one or more segments of the image file that are already stored in the local storage device;
obtaining the one or more segments from the local storage device; and
returning the one or more segments to the second virtual machine for use by the second virtual machine.

8. The system of claim 1, wherein the memory device further comprises instructions that are executable by the processing device for causing the processing device to, in response to receiving the read request:
store the segment of the image file in the local storage device separately from updating the log.

9. The system of claim 1, wherein the memory device further comprises instructions that are executable by the processing device for causing the processing device to, in response to receiving the read request:
determine that the segment is not stored in the local storage device by accessing the log indicating which portions of the image file are stored in the local storage device; and
in response to determining that the segment is not stored in the local storage device:
obtain the segment from the remote storage device;
store the segment in the local storage device to enable a subsequent read request for the segment to be fulfilled using the local storage device; and
provide the segment to the virtual machine in a read response to the read request.

10. The system of claim 9, wherein the read request is in a first format configured for the local storage device, and wherein the memory device further comprises instructions that are executable by the processing device for causing the processing device to:
obtain the segment from the remote storage device by translating at least a portion of the read request into a second format that is different from the first format, the second format being configured for obtaining the segment from the remote storage device.

11. A method comprising:
receiving, by a computing system, a read request from a virtual machine during a process for deploying the virtual machine using an image file, the read request being for obtaining a segment of the image file for use by the virtual machine;
in response to receiving the read request:
downloading, by the computing system, the segment of the image file from a remote storage device over a network;
storing, by the computing system, the segment of the image file in a local storage device that is a block storage device;
storing, by the computing system, the segment of the image file in a cache memory that is separate from the local storage device;
updating, by the computing system, a log to indicate that the segment of the image file is stored in the local storage device, the log being configured to be dynamically updated as segments of the image file are stored in the local storage device over time; and
returning, by the computing system, the downloaded segment to the virtual machine;
receiving, by the computing system, a delete command indicating that the segment of the image file is to be deleted from the local storage device; and
updating, by the computing system, the log in response to receiving the delete command.

12. The method of claim 11, wherein the remote storage device is an object storage device.

13. The method of claim 11, further comprising responding to receiving the read request by:
determining that the segment is not stored in the local storage device by accessing the log indicating which portions of the image file are stored in the local storage device; and
in response to determining that the segment is not stored in the local storage device:
obtaining the segment from the remote storage device;
storing the segment in the local storage device to enable a subsequent read request for the segment to be fulfilled using the local storage device rather than the remote storage device; and
providing the segment to the virtual machine in a read response to the read request.

14. The method of claim 11, wherein the read request is in a first format configured for the local storage device, further comprising:
obtaining the segment from the remote storage device by translating at least a portion of the read request into a second format that is different from the first format, the second format being configured for obtaining the segment from the remote storage device.

15. The method of claim 11, further comprising:
receiving a write command from the virtual machine, the write command being for storing data in the local storage device;
determining that a prior version of the data does not exist in the local storage device using the log; and
in response to determining that the prior version of the data does not exist in the local storage device:

obtaining the prior version of the data from the remote storage device;

overwriting a portion of the prior version of the data with new data indicated in the write command, thereby forming an updated version of the data;

storing the updated version of the data in the local storage device; and updating the log to indicate that the data is stored in the local storage device.

16. The method of claim 11, wherein the network includes the Internet.

17. A non-transitory computer-readable medium comprising program code that is executable by a processing device for causing the processing device to:

receive a read request from a virtual machine during a process for deploying the virtual machine using an image file, the read request being for obtaining a segment of the image file for use by the virtual machine;

in response to receiving the read request:

download the segment of the image file from a remote storage device over a network, wherein the remote storage device is an object storage device;

store the segment of the image file in a local storage device;

store the segment of the image file in a cache memory that is separate from the local storage device;

update a log to indicate that the segment of the image file is stored in the local storage device, the log being configured to be dynamically updated as segments of the image file are stored in the local storage device over time; and return the downloaded segment to the virtual machine;

receive a delete command indicating that the segment of the image file is to be deleted from the local storage device; and update the log in response to receiving the delete command.

18. The non-transitory computer-readable medium of claim 17, further comprising program code that is executable by the processing device for causing the processing device to respond to receiving the read request by:

determining that the segment is not stored in the local storage device by accessing the log indicating which portions of the image file are stored in the local storage device; and in response to determining that the segment is not stored in the local storage device:

obtaining the segment from the remote storage device;

storing the segment in the local storage device to enable a subsequent read request for the segment to be fulfilled using the local storage device rather than the remote storage device; and providing the segment to the virtual machine in a read response to the read request.

19. The non-transitory computer-readable medium of claim 17, wherein the read request is in a first format configured for the local storage device, further comprising program code that is executable by the processing device for causing the processing device to:

obtain the segment from the remote storage device by translating at least a portion of the read request into a second format that is different from the first format, the second format being configured for obtaining the segment from the remote storage device.

20. The non-transitory computer-readable medium of claim 17, further comprising program code that is executable by the processing device for causing the processing device to:

receive a write command from the virtual machine, the write command being for storing data in the local storage device;

determine that a prior version of the data does not exist in the local storage device using the log; and in response to determining that the prior version of the data does not exist in the local storage device:

obtain the prior version of the data from the remote storage device;

overwrite a portion of the prior version of the data with new data indicated in the write command, thereby forming an updated version of the data;

store the updated version of the data in the local storage device; and update the log to indicate that the data is stored in the local storage device.

* * * * *